United States Patent
Bhatia et al.

(10) Patent No.: US 7,463,614 B2
(45) Date of Patent: Dec. 9, 2008

(54) METHOD AND APPARATUS TO FACILITATE PROVISION OF AN IPV6 PREFIX

(75) Inventors: Ravideep Bhatia, West Dundee, IL (US); Ali Akgun, Chicago, IL (US)

(73) Assignee: UTStarcom, Inc., Alameda, CA (US)

( * ) Notice: Subject to any disclaimer, the term of this patent is extended or adjusted under 35 U.S.C. 154(b) by 632 days.

(21) Appl. No.: 11/013,621

(22) Filed: Dec. 16, 2004

(65) Prior Publication Data
US 2006/0133301 A1  Jun. 22, 2006

(51) Int. Cl.
*H04Q 7/24* (2006.01)
(52) U.S. Cl. ...................................................... 370/338
(58) Field of Classification Search ................. 370/464, 370/466, 465, 338, 351–356, 389, 401; 709/245, 709/238, 229
See application file for complete search history.

(56) References Cited

U.S. PATENT DOCUMENTS

| | | | |
|---|---|---|---|
| 6,865,184 B2 * | 3/2005 | Thubert et al. ............... | 370/401 |
| 2002/0031135 A1 | 3/2002 | Inoue | |
| 2003/0058855 A1 | 3/2003 | Feyerabend et al. | |
| 2004/0006641 A1 | 1/2004 | Abrol et al. | |
| 2004/0100953 A1 * | 5/2004 | Chen et al. ................... | 370/389 |
| 2004/0158639 A1 | 8/2004 | Takusagawa et al. | |
| 2004/0179536 A1 * | 9/2004 | Thubert et al. ......... | 370/395.52 |
| 2004/0190549 A1 | 9/2004 | Huitema | |
| 2005/0138166 A1 * | 6/2005 | Blanchet ..................... | 709/224 |
| 2005/0265259 A1 * | 12/2005 | Thubert et al. ............... | 370/255 |
| 2006/0083262 A1 * | 4/2006 | Bhatia et al. .................. | 370/466 |
| 2006/0092949 A1 * | 5/2006 | Thubert et al. ......... | 370/395.52 |
| 2006/0168110 A1 * | 7/2006 | Warrier et al. ............... | 709/218 |
| 2006/0259639 A1 * | 11/2006 | Aken et al. ................... | 709/245 |
| 2008/0019330 A1 * | 1/2008 | Hirano et al. ................ | 370/338 |

FOREIGN PATENT DOCUMENTS

| WO | WO 2004/075487 A1 | 9/2004 |
|---|---|---|
| WO | WO 2004/100499 A1 | 11/2004 |

OTHER PUBLICATIONS

Narten, T., RFC2461-Neighbor Discovery for IP Version 6 (IPv6), 1998, [retrieved online on Dec. 13, 2005], retrieved from the internet URL>http://www.faqs.org/faqs. (86 pgs.).

Hinden,R., RFC3513-Internet Protocol Version 6 (IPv6) Addressing Architecture, 2003, [retrieved online on Dec. 13, 2005], retrieved from the internet URL>http://www.faqs.org/faqs. (23 pgs.).

(Continued)

*Primary Examiner*—Ajit Patel

(57) ABSTRACT

A mobile station indicates a need for at least one specific type of Internet Protocol version 6 (IPv6) prefix in a message (73) transmitted to a serving network element. The latter processes this message to determine (74) the indicated IPv6 prefix type and responds with a reply message (75) comprising, at least in part, an IPv6 prefix of a type that is commensurate with the type (or types) indicated by the mobile station in the aforementioned message.

28 Claims, 3 Drawing Sheets

OTHER PUBLICATIONS

Carpenter, B., RFC3056-Connections of IPv6 Domians via IPv4 Clouds, 2001, [retrieved online on Dec. 13, 2005], retrieved from the internet URL>http://www.faqs.org/faqs. (22 pgs.).

3rd Generation Partnership Project 2 (3GGPP2), "cdma2000 Wireless IP Network Standard: Introduction", 3GPP2 X.S0011-001-C, Version 1.0.0, Aug. 2003, 25 pages.

3rd Generation Partnership Project 2 (3GGPP2), "cdma2000 Wireless IP Network Standard: Simple IP and Mobile Access Services", 3GPP2 X.S0011-001-C, Version 1.0.0, Aug. 2003, 44 pages.

3rd Generation Partnership Project 2 (3GGPP2), "cdma2000 Wireless IP Network Standard: Packet Data Mobility and Resource Management", 3GPP2 X.S0011-003-C, Version 1.0.0, Aug. 2003, 30 pages.

3rd Generation Partnership Project 2 (3GGPP2), "cdma2000 Wireless IP Network Standard: Quality of Service and Header Reduction", 3GPP2 X.S0011-004-C, Version 1.0.0, Aug. 2003, 44 pages.

3rd Generation Partnership Project 2 (3GGPP2), "cdma2000 Wireless IP Network Standard: Accounting Services and 3GPP2 RADUIS VSAs", 3GPP2 X.S0011-005-C, Version 1.0.0, Aug. 2003, 48 pages.

3rd Generation Partnership Project 2 (3GGPP2)," cdma2000 Wireless IP Network Standard: PrePaid Packet Data Service", 3GPP2 X.S0011-006-C, Version 1.0.0, Aug. 2003, 36 pages.

* cited by examiner

US 7,463,614 B2

METHOD AND APPARATUS TO FACILITATE PROVISION OF AN IPV6 PREFIX

TECHNICAL FIELD

This invention relates generally to Internet Protocol version 6 (IPv6) and more particularly to the provision of IPv6 prefixes.

BACKGROUND

Internet Protocol version 4 and the more recently promulgated Internet Protocol version 6 (IPv6) are well known in the art. Pursuant to these protocols, addresses serve to identify communication sources and targets to thereby facilitate the routing and delivery of corresponding messages and bearer content. A portion of these addresses comprises a so-called prefix.

Pursuant to CDMA2000 (a wireless communication standard based upon Code Division Multiple Access (CDMA)), mobile stations that support IPv6 obtain a global IPv6 address using a so-called router advertisement. In particular, following establishment of a Point-to-Point Protocol (PPP) link (during which a portion of an identifier for the mobile station is negotiated), a Packet Data Serving Node (PDSN) will source a router advertisement that contains IPv6 prefix information. The mobile station then combines that IPv6 prefix information with the previously negotiated identifier to thereby generate a global IPv6 address. The mobile station uses this global IPv6 address for subsequent communications with other nodes.

At present, not all IPv6 prefixes are wholly fungible as compared to one another. There are at least IPv6 global prefixes and so-called 6to4 prefixes. At present, a Packet Data Serving Node will determine whether to assign a global prefix or a 6to4 prefix in a given instance based on a preconfigured policy. For example, the Packet Data Serving Node may be configured to select a particular prefix type based on a domain name presented by the mobile station during Point-to-Point Protocol negotiations.

Such local policy approaches, however, do not adequately address all likely scenarios. Typically, only the mobile station knows the destination address it wishes to ultimately seek. When the target destination address comprises a global IPv6 address, then the target is reachable through an IPv6 network and therefore a global IPv6 address (and hence a global IPv6 prefix) can be successfully used as a source address by the mobile station. When the destination address comprises a 6to4 address, however, the target destination is typically not reachable via an IPv6 network and hence a 6to4 address (and prefix) should be used for a source address.

One proposed solution has the Packet Data Serving Node providing both a global IPv6 prefix and a 6to4 prefix, presuming that the mobile station can then select and use the most appropriate prefix commensurate with its needs. Such an approach, however, represents an obviously inefficient allocation of available prefix resources.

BRIEF DESCRIPTION OF THE DRAWINGS

The above needs are at least partially met through provision of the method and apparatus to facilitate provision of an IPv6 prefix described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, a mobile station transmits a message to a serving network element (such as, but not limited to, a Packet Data Serving Node). This message indicates a need for at least one IPv6 prefix. More particularly, in a preferred approach, this message comprises, at least in part, any of:

an indication that the mobile station has need of an IPv6 prefix (that is, a global IPv6 prefix);

an indication that the mobile station has need of an IPv6 6to4 prefix;

an indication that the mobile station has need of both an IPv6 prefix and an IPv6 6to4 prefix.

Pursuant to a preferred approach, the serving network element, upon receiving this message, processes the message to determine the type of IPv6 prefix being sought by the mobile station. This serving network element then transmits a reply message to the mobile station comprising at least one IPv6 version prefix of a type as corresponds to the type indicated in the message.

So configured, a mobile station need only be allocated IPv6 prefixes as correspond to its present needs. This, in turn, avoids the need to over-allocate prefix resources. The mobile station is thereafter ready and able to conveniently effect its desired communication needs without further negotiation or interaction regarding the IPv6 prefix portion of its identifier.

Figure 1:
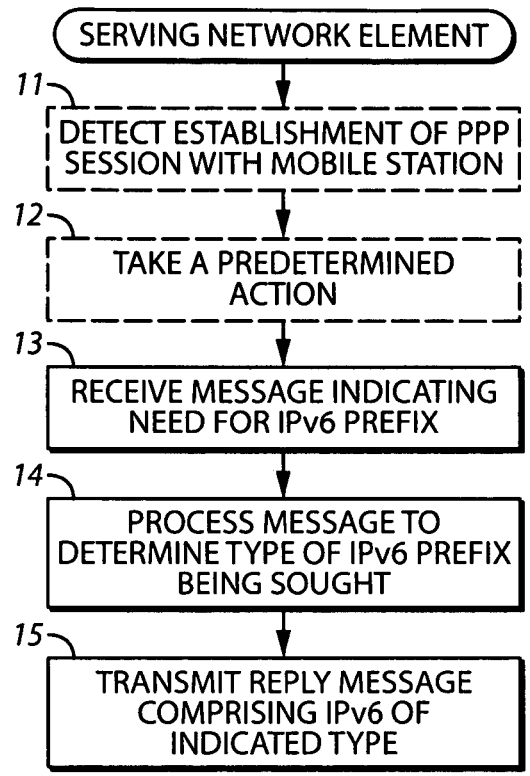
FIG. 1 comprises a flow diagram as configured in accordance with various embodiments of the invention.

These and other benefits may become more evident upon making a thorough review and study of the following detailed description. Referring now to the drawings, and in particular to FIG. 1, a process 10 to be preferably effected by a serving network element (such as, but not limited to, a Packet Data Serving Network) will first be described. Though not necessarily essential to this process 10, one may optionally provide for detection 11 of establishment of a Point-to-Point Protocol session with a mobile station. This process 10 can then optionally provide for the responsive taking 12 of some corresponding predetermined action. As one example, and for reasons that will be made more clear below, this response can comprise not transmitting an automatic message that comprises, at least in part, an IPv6 prefix for use by that mobile station when sourcing messages. In the alternative, and as another example, this response can comprise automatically transmitting a default type of IPv6 prefix (such as a global IPv6 prefix or a 6to4 prefix) for use by the mobile station when sourcing messages.

In any event, this process 10 then provides for receiving 13 a message (from, for example, that same mobile station) that comprises, at least in part, any of:

- an indication that the mobile station has need of an IPv6 prefix;
- an indication that the mobile station has need of an IPv6 6to4 prefix;
- an indication that the mobile station has need of both an IPv6 prefix and an IPv6 6to4 prefix.

This message can comprise, for example, a router solicitation message (comprising, for example, an option field that contains a value specifying the type of IPv6 prefix that is being sought by the mobile station) or, if desired, a proprietary message configured and arranged to convey the indicated information.

This process 10 then processes 14 that message to determine the type of IPv6 prefix being sought by the mobile station. This serving network element then transmits 15 a reply message to the mobile station comprising at least one IPv6 prefix of a type as corresponds to an IPv6 prefix type as is indicated in the message. This replay message can assume any desired form including, but not limited to, a router advertisement, a proprietary message, and so forth.

So configured, the serving network element has an ability to ascertain a kind of IPv6 prefix presently needed by a given mobile station and to respond accordingly. When this process 10 encompasses the establishment of the Point-to-Point Protocol session as described above, the serving network element is further enabled to assess self-identifying information as presented by the mobile station to determine whether a standard response is appropriate or whether a specialized response (such as determining not to provide an IPv6 prefix of any type at this time, or a default type of IPv6 prefix) is presently appropriate.

Figure 2:
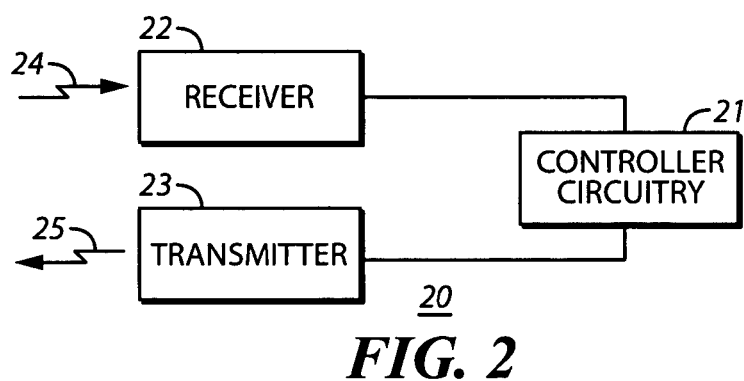
FIG. 2 comprises a block diagram as configured in accordance with various embodiments of the invention.

As suggested above, a Packet Data Serving Node can serve as the serving network element when implementing such a process. With reference to FIG. 2, while Packet Data Serving Nodes comprise well-understood prior art elements, for these purposes it may be noted that a preferred Packet Data Serving Node 20 will comprise controller circuitry 21, a receiver 22, and a transmitter 23. The receiver 22 serves, at a minimum, to receive a message 24 as sourced by a mobile station (such as, but not limited to, a router solicitation, a proprietary message, and so forth) as described above. The transmitter 25, in turn, serves, at a minimum, to source a reply message as described above (such as, but not limited to, a router advertisement, a proprietary message, and so forth).

The controller circuitry 21 serves, in addition to supporting other standard PDSN functions, to facilitate a response to a received message that comprises an indication of a particular desired type of IPv6 prefix. In particular, the controller circuitry is configured and arranged to facilitate processing such a message to determine a type of IPv6 prefix that is being sought by the mobile station and to effect transmission of a reply message that comprises, at least in part, an IPv6 prefix as corresponds to the indicated type. (Those skilled in the art will recognize and understand that the Packet Data Serving Node will typically select a particular IPv6 prefix from amongst an allocable pool of such resources as are available to the Packet Data Serving Node in accordance with well-understood prior art technique.)

Figure 3:
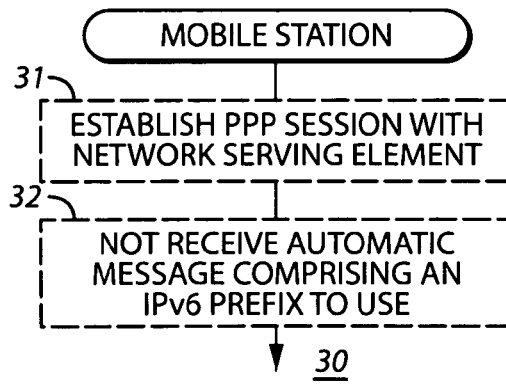
FIG. 3 comprises a flow diagram as configured in accordance with various embodiments of the invention.

Pursuant to one approach 30, the mobile station also plays a role in effecting a desired sequence of events. As noted earlier, and referring now to FIG. 3, the mobile station can optionally establish 31 a Point-to-Point Protocol session with the serving network element. Pursuant to one optional approach, the mobile station can be configured and arranged to effectively not receive 32, in response to establishing the Point-to-Point Protocol session, an automatic message that comprises, at least in part, an IPv6 prefix for use by the mobile station when sourcing messages. That is, the mobile station can be configured to either not expect or require such a response, or to effect a subsequent response when no such response is forthcoming. The precise nature of this action will vary with the needs and requirements of a given application.

Figure 4:
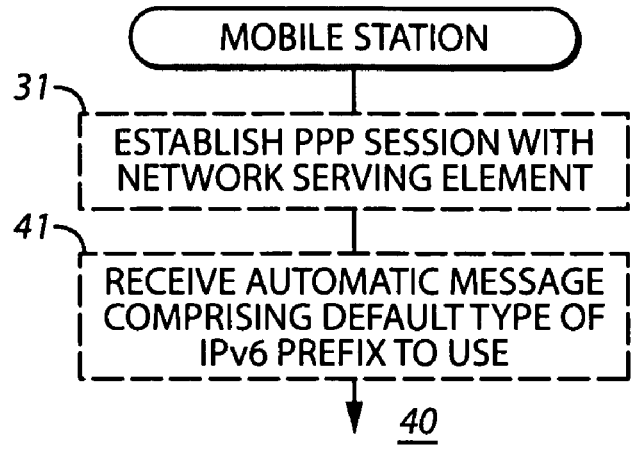
FIG. 4 comprises a flow diagram as configured in accordance with various embodiments of the invention.

Pursuant to another approach 40, and referring now to FIG. 4, the mobile station, again upon establishing 31 the Point-to-Point Protocol session, can be configured and arranged to then receive 41, in response to establishing that session, a default type of IPv6 prefix to be used by that mobile station when sourcing messages. This default type, of course, may be inappropriate for any given mobile station. Therefore, this action can comprise, if desired, an ability to effect subsequent steps as described below when the default IPv6 prefix type is inappropriate to the mobile station's needs (and/or to make use of that IPv6 when the default type in fact comprises a type of IPv6 prefix that is needed by the mobile station).

Figure 5:
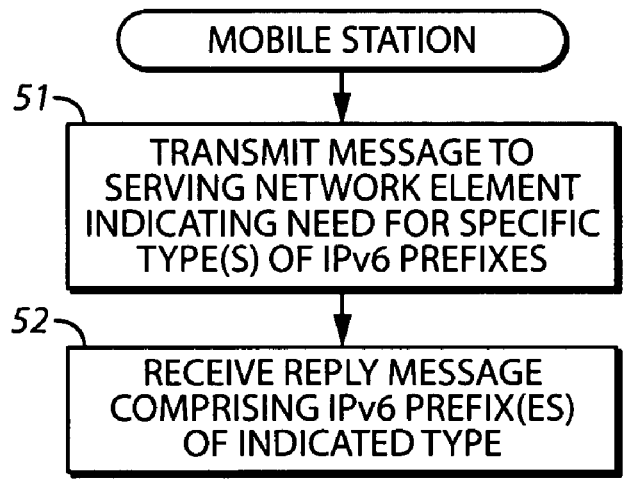
FIG. 5 comprises a flow diagram as configured in accordance with various embodiments of the invention.

Regardless of the presence or absence of any such preliminary optional steps, and referring now to FIG. 5, in a preferred process 50 the mobile station will transmit 51 a message to a serving network element to indicate a need for at least one IPv6 prefix. Pursuant to a preferred embodiment, that message will comprise, at least in part, any of:

- an indication that the mobile station has need of an IPv6 prefix;
- an indication that the mobile station has need of an IPv6 6to4 prefix;
- an indication that the mobile station has need of both an IPv6 prefix and an IPv6 6to4 prefix.

As mentioned above, this message can comprise a router solicitation message (having, for example, an option field that contains a value that specifies the type of IPv6 prefix being sought by the mobile station), a proprietary message, or any other message (or messages) that will serve in this regard.

In a preferred approach, this process 50 also serves to permit receipt 52 of a reply message from the serving network element that comprises at least one IPv6 prefix of a type that corresponds to the IPv6 prefix type as is indicated in the earlier transmitted message. Again, as mentioned above, this reply message can comprise a router advertisement, a proprietary message, or any other conveyance vehicle that will serve in this regard.

Figure 6:
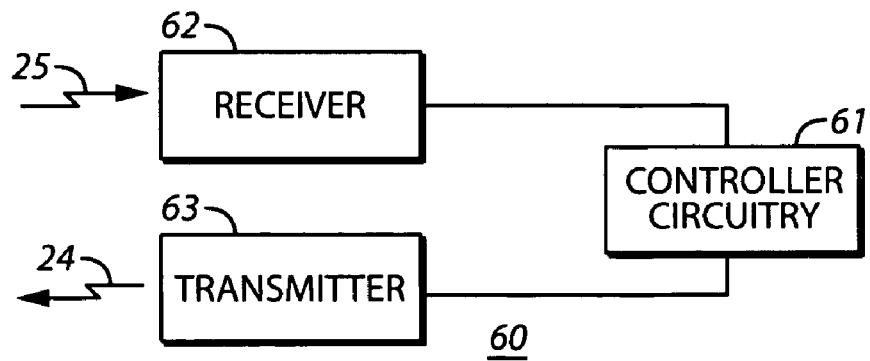
FIG. 6 comprises a block as configured in accordance with various embodiments of the invention.

Referring now to FIG. 6, an exemplary mobile station 60 comprises controller circuitry 61, a receiver 62 operably coupled to the controller circuitry 61, and a transmitter 63 that also operably couples to the controller circuitry 61. The transmitter 63 serves, at least in part, to transmit the aforementioned message 24 which indicates a type of desired IPv6 prefix and the receiver 62 serves, at least in part, to receive the aforementioned reply message 25 as provided by the serving network element. The controller circuitry 61 serves, in a preferred approach, to effect such a transmission and to appropriately process such a reply message.

Figure 7:
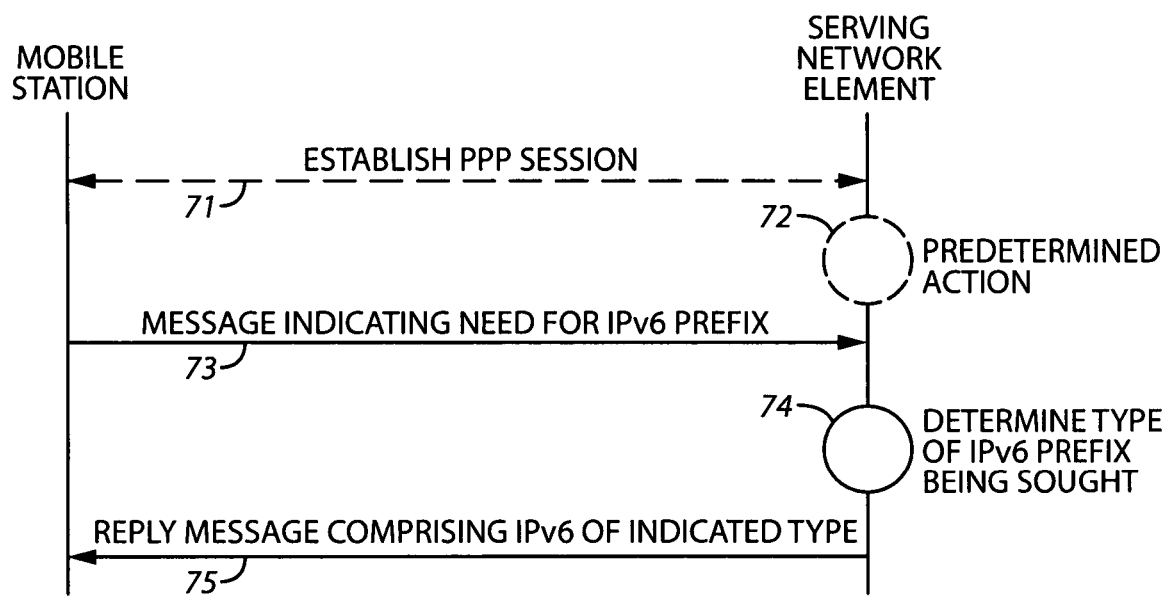
FIG. 7 comprises a signal flow diagram as configured in accordance with various embodiments of the invention.

Referring now to FIG. 7, an illustrative series of messages and corresponding actions can optionally begin, as suggested above, with establishment of a Point-to-Point Protocol session 71. In typical course such a session will be initiated by the mobile station though other possibilities can also be accommodated. As also suggested above, and pursuant to an optional configuration, the serving network element can respond to establishment of the Point-to-Point Protocol session with a predetermined action 72 (such as by electing to not effect an automatic transmission comprising one or more IPv6 prefixes of one or more types, or by electing to effect an automatic transmission of a default type of IPv6 prefix).

In any event, the mobile station then sources transmission of a message 73 that indicates a need for at least one IPv6 prefix. More particularly, this message preferably specifies or otherwise indicates a specific type (or types) of desired IPv6 prefix. Upon receiving this message, the recipient serving network element then processes the message to determine 74 the type of IPv6 prefix being sought by the mobile station. Upon making this determination, the serving network element then transmits a reply message 75 that comprises, at least in part, one or more IPv6 prefixes of a type that corresponds the ascertained type as indicated by the mobile station.

For example, when the mobile station indicates a need for an IPv6 prefix, the serving network element replies with an IPv6 prefix. As another example, when the mobile station indicates a need for an IPv6 6to4 prefix, the serving network element replies with an IPv6 6to4 prefix. And, as yet another example, when the mobile station indicates a need for both an IPv6 prefix and an IPv6 6to4 prefix, the serving network element replies with both an IPv6 prefix and an IPv6 6to4 prefix.

So configured and arranged, those skilled in the art will appreciate that the above-described teachings aid considerably with respect to ensuring both that a mobile station has the prefix resources it requires in order to effect its desired communications while also tending to minimize or at least greatly reduce wasteful and unnecessary allocation of unneeded IPv6 prefix resources.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

For example, when the serving network element has first allocated a default type of IPv6 prefix to the mobile station (in response, for example, to establishment of the Point-to-Point Protocol session as described above), then upon providing a specific IPv6 prefix to the mobile station in response to the specific type of IPv6 prefix indication described above, the serving network element can then effectively de-allocate that earlier assigned default type of IPv6 prefix (for example, by including in the reply message content to effect such de-allocation).

As another example, and again when the serving network element may have earlier allocated a default type of IPv6 prefix to the mobile station, upon providing a specific type of IPv6 prefix to the mobile station via the reply message the serving network element may also include content that effectively maintains that earlier allocation of the default type of IPv6 prefix. This action may be appropriate, for example, when the mobile station has indicated a need both for the later assigned IPv6 prefix type and the default type of IPv6 prefix.

We claim:

1. A method comprising:
   at a mobile station:
      establishing a Point-to-Point Protocol session with a serving network element;
      at the serving network element;
         in response to establishment of the Point-to-Point Protocol session, taking a predetermined action, wherein the predetermined action comprises automatically transmitting a default type of Internet Protocol version 6 prefix for use by the mobile station when sourcing messages;
      at the mobile station:
         transmitting a message wherein the message comprises, at least in part, any of:
            an indication that the mobile station has need of an Internet Protocol version 6 prefix;
            an indication that the mobile station has need of an Internet Protocol version 6 6to4 prefix;
            an indication that the mobile station has need of both an Internet Protocol version 6 prefix and an Internet Protocol version 6 6to4 prefix;
      at a serving network element:
         receiving the message;
         processing the message to determine a type of Internet Protocol version 6 prefix that is being sought by the mobile station;
         transmitting a reply message to the mobile station comprising at least one Internet Protocol version 6 prefix of a type as corresponds to an Internet Protocol version 6 prefix type as is indicated in the message, wherein, when processing the message to determine a type of Internet Protocol version 6 prefix that is being sought by the mobile station reveals that the mobile station is seeking a type of Internet Protocol version 6 prefix that is different than the default type, transmitting a reply message to the mobile station further comprises transmitting a reply message to the mobile station comprising:
            at least one Internet Protocol version 6 prefix of a type as corresponds to an Internet Protocol version 6 prefix type as is indicated in the message;
            content that effectively de-allocates the default type of Internet Protocol version 6 prefix.

2. The method of claim 1 wherein the message comprises a router solicitation message.

3. The method of claim 1 wherein the message comprises a proprietary message.

4. The method of claim 2 wherein the router solicitation message further comprises an option field containing a value specifying the type of Internet Protocol version 6 prefix that is being sought by the mobile station.

5. The method of claim 1 wherein the reply message comprises a router advertisement.

6. The method of claim 1 wherein the reply message comprises a proprietary message.

7. comprising:
   at a mobile station:
      establishing a Point-to-Point Protocol session with a serving network element;
   at the serving network element:
      in response to establishment of the Point-to-Point Protocol session, taking a predetermined action, wherein the predetermined action comprises automatically transmitting a default type of Internet Protocol version 6 prefix for use by the mobile station when sourcing messages;
   at the mobile station:
      transmitting a message wherein the message comprises, at least in part, any of:
         an indication that the mobile station has need of an Internet Protocol version 6 prefix;

an indication that the mobile station has need of an Internet Protocol version 6 6to4 prefix;

an indication that the mobile station has need of both an Internet Protocol version 6 prefix and an Internet Protocol version 6 6to4 prefix;

at a serving network element:

receiving the message;

processing the message to determine a type of Internet Protocol version 6 prefix that is being sought by the mobile station;

transmitting a reply message to the mobile station comprising at least one Internet Protocol version 6 prefix of a type as corresponds to an Internet Protocol version 6 prefix type as is indicated in the message, wherein, when processing the message to determine a type of Internet Protocol version 6 prefix that is being sought by the mobile station reveals that the mobile station is seeking an additional type of Internet Protocol version 6 prefix that is different than the default type, transmitting a reply message to the mobile station further comprises transmitting a reply message to the mobile station comprising: at least one Internet Protocol version 6 prefix of a type that is different from the default type of Internet Protocol version 6 prefix; content that effectively maintains allocation of the default type of Internet Protocol version 6 prefix.

8. A method for use by a serving network element comprising:

detecting establishment of a Point-to-Point Protocol session with a mobile station;

in response to establishment of the Point-to-Point Protocol session, taking a predetermined action, wherein the predetermined action comprises automatically transmitting a default type of Internet Protocol version 6 prefix for use by the mobile station when sourcing messages;

receiving a message from the mobile station wherein the message comprises, at least in part, any of:

an indication that the mobile station has need of an Internet Protocol version 6 prefix;

an indication that the mobile station has need of an Internet Protocol version 6 6to4 prefix;

an indication that the mobile station has need of both an Internet Protocol version 6 prefix and an Internet Protocol version 6 6to4 prefix;

processing the message to determine a type of Internet Protocol version 6 prefix that is being sought by the mobile station;

transmitting a reply message to the mobile station comprising at least one Internet Protocol version 6 prefix of a type as corresponds to an Internet Protocol version 6 prefix type as is indicated in the message, wherein, when processing the message to determine a type of Internet Protocol version 6 prefix that is being sought by the mobile station reveals that the mobile station is seeking a type of Internet Protocol version 6 prefix that is different than the default type, transmitting a reply message to the mobile station further comprises transmitting a reply message to the mobile station comprising: at least one Internet Protocol version 6 prefix of a type as corresponds to an Internet Protocol version 6 prefix type as is indicated in the message; content that effectively de-allocates the default type of Internet Protocol version 6 prefix.

9. The method of claim 8 wherein the message comprises a router solicitation message.

10. The method of claim 8 wherein the message comprises a proprietary message.

11. The method of claim 9 wherein the router solicitation message further comprises an option field containing a value specifying the type of Internet Protocol version 6 prefix that is being sought by the mobile station.

12. The method of claim 8 wherein the reply message comprises a router advertisement.

13. The method of claim 8 wherein the reply message comprises a proprietary message.

14. The method of claim 8 wherein the predetermined action comprises not transmitting an automatic message that comprises, at least in part, an Internet Protocol version 6 prefix for use by the mobile station when sourcing messages.

15. A method for use by a serving network element comprising:

detecting establishment of a Point-to-Point Protocol session with a mobile station;

in response to establishment of the Point-to-Point Protocol session, taking a predetermined action, wherein the predetermined action comprises automatically transmitting a default type of Internet Protocol version 6 prefix for use by the mobile station when sourcing messages;

receiving a message from the mobile station wherein the message comprises, at least in part, any of:

an indication that the mobile station has need of an Internet Protocol version 6 prefix;

an indication that the mobile station has need of an Internet Protocol version 6 6 to 4 prefix;

an indication that the mobile station has need of both an Internet Protocol version 6 prefix and an Internet Protocol version 6 6to4 prefix;

processing the message to determine a type of Internet Protocol version 6 prefix that is being sought by the mobile station;

transmitting a reply message to the mobile station comprising at least one Internet Protocol version 6 prefix of a type as corresponds to an Internet Protocol version 6 prefix type as is indicated in the message, wherein, when processing the message to determine a type of Internet Protocol version 6 prefix that is being sought by the mobile station reveals that the mobile station is seeking an additional type of Internet Protocol version 6 prefix that is different than the default type, transmitting a reply message to the mobile station further comprises transmitting a reply message to the mobile station comprising:

at least one Internet Protocol version 6 prefix of a type that is different from the default type of Internet Protocol version 6 prefix;

content that effectively maintains allocation of the default type of Internet Protocol version 6 prefix.

16. The method of claim 8 wherein the serving network element comprises, at least in part, a packet data serving node.

17. A serving network element comprising:

means for detecting establishment of a Point-to-Point Protocol session with a mobile station and for responding to the establishment of the Point-to-Point Protocol session by taking a predetermined action, wherein the predetermined action comprises automatically transmitting a default type of Internet Protocol version 6 prefix for use by the mobile station when sourcing messages;

means for receiving a message from a mobile station wherein the message comprises, at least in part, any of:

an indication that the mobile station has need of an Internet Protocol version 6 prefix;

an indication that the mobile station has need of an Internet Protocol version 6 6to4 prefix;

an indication that the mobile station has need of both an Internet Protocol version 6 prefix and an Internet Protocol version 6 6to4 prefix;

means for processing the message to determine a type of Internet Protocol version 6 prefix that is being sought by the mobile station;

means for transmitting a reply message to the mobile station comprising at least one Internet Protocol version 6 prefix of a type as corresponds to an Internet Protocol version 6 prefix type as is indicated in the message, wherein, when processing the message to determine a type of Internet Protocol version 6 prefix that is being sought by the mobile station reveals that the mobile station is seeking an additional type of Internet Protocol version 6 prefix that is different than the default type. transmitting a reply message to the mobile station further comprises transmitting a reply message to the mobile station comprising:

at least one Internet Protocol version 6 prefix of a type that is different from the default type of Internet Protocol version 6 prefix;

content that effectively maintains allocation of the default type of Internet Protocol version 6 prefix.

18. The serving network element of claim 17 wherein the message comprises a router solicitation message.

19. The serving network element of claim 17 wherein the message comprises a proprietary message.

20. The serving network element of claim 18 wherein the router solicitation message further comprises an option field containing a value specifying the type of Internet Protocol version 6 prefix that is being sought by the mobile station.

21. The serving network element of claim 17 wherein the reply message comprises a router advertisement.

22. The serving network element of claim 17 wherein the reply message comprises a proprietary message.

23. The serving network element of claim 17 wherein the serving network element comprises a packet data serving node.

24. A packet data serving node comprising:

a receiver;

a transmitter;

controller circuitry operably coupled to the receiver and the transmitter and that is configured and arranged to:

be responsive to establishment of a Point-to-Point Protocol session with a mobile station by taking a predetermined action, wherein the predetermined action comprises automatically transmitting a default type of Internet Protocol version 6 prefix for use by the mobile station when sourcing messages; to be responsive to a received message from a mobile station, wherein the message comprises, at least in part, any of:

an indication that the mobile station has need of an Internet Protocol version 6 prefix;

an indication that the mobile station has need of an Internet Protocol version 6 6to4 prefix;

an indication that the mobile station has need of both an Internet Protocol version 6 prefix and an Internet Protocol version 6 6to4 prefix; and when processing the message to determine a type of Internet Protocol version 6 prefix that is being sought by the mobile station reveals that the mobile station is seeking a type of Internet Protocol version 6 prefix that is different than the default type, transmit a reply message to the mobile station comprising:

at least one Internet Protocol version 6 prefix of a type as corresponds to an Internet Protocol version 6 prefix type as is indicated in the message;

content that effectively de-allocates the default type of Internet Protocol version 6 prefix.

25. The packet data serving node of claim 24 wherein the controller circuitry is further configured and arranged to process the message to determine a type of Internet Protocol version 6 prefix that is being sought by the mobile station.

26. The packet data serving node of claim 24 wherein the reply message comprises a router advertisement.

27. The packet data serving node of claim 24 wherein the reply message comprises a proprietary message.

28. The packet data serving node of claim 24 wherein the controller circuitry further comprises:

means for processing the message to determine a type of Internet Protocol version 6 prefix that is being sought by the mobile station;

means for transmitting a reply message to the mobile station comprising at least one Internet Protocol version 6 prefix of a type as corresponds to an Internet Protocol version 6 prefix type as is indicated in the message.

* * * * *